T. S. C. LOWE
Improvement in Manufacture of Gas.
No. 130,382.  Patented Aug. 13, 1872.
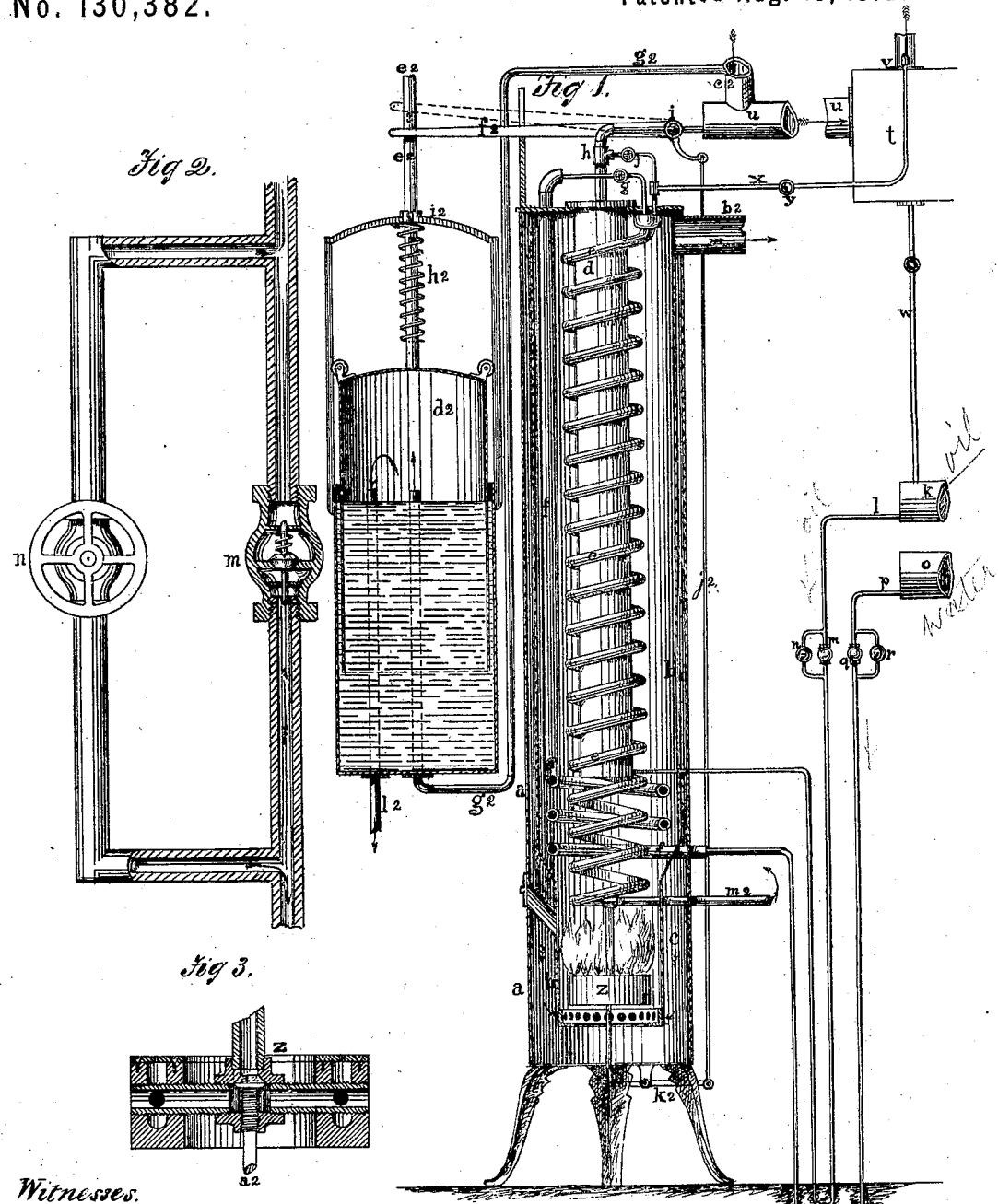
Witnesses.
Ed. J. Fasy.
Wm. E. Moore.
Inventor.
T. S. C. Lowe

UNITED STATES PATENT OFFICE.

THADDEUS S. C. LOWE, OF NORRISTOWN, PENNSYLVANIA.

IMPROVEMENT IN THE MANUFACTURE OF GAS.

Specification forming part of Letters Patent No. 130,382, dated August 13, 1872.

Specification describing Apparatus for Making Gas for use in lighting dwellings and other buildings and for domestic heating and cooking purposes, invented by THADDEUS S. C. LOWE, of Norristown, Montgomery county, Pennsylvania.

The object of this apparatus is to generate an inexpensive gas for heating and cooking purposes by the decomposition of water after the same has been converted into steam, a result which is accomplished by mixing carbon in the form of oil-vapors with the steam and heating the mass sufficiently to convert it into carbonic oxide and hydrogen in a mixed state; also, at the same time, to generate for illuminating purposes a rich hydrocarbon-gas and to reduce the same, while hot, with atmospheric air.

In the annexed drawing, Figure 1 is a vertical section of the complete apparatus. Fig. 2 represents an elevation of the stop-cock $n$ and a longitudinal section of the safety-valve $m$. Fig. 3 is a vertical section of the gas-burner $z$ on an enlarged scale.

$a$ and $b$, Fig. 1, are cylinders or casings of sheet-iron or other suitable material. Between these cylinders there is an air-space, $c$, closed by heads at top and bottom. The cylinder $a$ has a number of small holes at or near its top, (not shown,) for admitting air into the space $c$. The cylinder $b$ has similar holes at its lower end for admitting the same air to the burner $z$. $d$ is an iron retort suspended from the head of cylinders $a$ and $b$ and surrounded by a coil of iron tubing, $e$. $f$ is a separate coil of iron tubing surrounding the coil $e$. It is used for the generation of steam. Its upper end extends through the head of cylinders $a$ and $b$, and is provided with a stop-cock, $g$. $h$ is a pipe leading from the upper end of the retort $d$ and provided with a valve, $i$, and a branch pipe with a cock, $j$. $k$ is a tank for holding hydrocarbon-oils. $l$ is a pipe connecting tank $k$ with the lower end of the retort $d$. $m$, Figs. 1 and 2, is a safety-valve, and $n$ is an ordinary stop-cock. $o$ is a tank for holding water. It is connected by the pipe $p$ to the end of the coil $f$, and is provided with the safety-valve $q$ and stop-cock $r$, which are similar to the valve and cock $m$ and $n$. $s$ and $s'$ are bends in the tubes $l$ and $p$. These bends extend several inches lower than the points at which they enter coil $f$ and retort $d$, respectively, for the purpose of preventing the steam and gas or vapor of oil from rising to the tanks $k$ and $o$, and to enable the column of liquids in tubes $l$ and $p$ to act with steady pressure against the vapors as they are generated in the coil $e$ and retort $d$. $t$ is a tank for holding naphtha, to wit: light products of petroleum. It is provided with an inlet-pipe, $u$, for admitting mixed air and gases, a delivery-pipe, $v$, and a drip-pipe, $w$, which is connected with the tank $k$. $x$ is a pipe branching from the delivery-pipe $v$. It has a stop-cock, $y$, and is connected with the coil $e$, and is used for conveying hydrocarbonized atmosphere into the coil $e$ for the generation of gas when starting the apparatus. $z$, Figs. 1 and 3, is a burner connected by a tube with the coil $e$, as shown, and provided with a valve, $a^2$, Fig. 3, for admitting gas and regulating the flame, to produce the heat inside of the apparatus. $b^2$ is a flue or draft-pipe connected with the space inside of cylinder $b$, for carrying off the waste products of combustion and drawing in the air for supporting combustion, as hereinafter described. $c^2$ is a tube for admitting either hot or cold air into the tube $u$ for the purpose of mixing the same with the hot carbon vapors and gases admitted through the tube $h$ from retort $d$. $d^2$ is a small regulator or inverted vessel similar to an ordinary gas-holder. It has a guide-rod, $e^2$. $f^2$ is an arm or lever attached to the valve or cock $i$. It is worked by the rising and falling of the regulator $a^2$. $g^2$ is a tube connected with the tube $c^2$ and leading into the chamber of the regulator $d^2$. $h^2$ is a spiral spring around the guide-rod $e^2$ and supported by the cross-bar $i^2$, for the purpose hereinafter described. $j^2$ is a rod connected at one end with the lever $f^2$ and at its other end with another lever, $k^2$, and this lever is attached to the valve $a^2$, and, by the rising and falling of governor $d^2$, may be used to regulate the heat inside of the generating apparatus. $l^2$ is a pipe which may be used, if desired, for conveying off a portion of the gas from the governor $d^2$, or it may be entirely closed.

When the apparatus is to be put into operation I introduce naphtha into the tank $t$, and also naphtha or other liquid hydrocarbons into tank $t$ and water into tank $o$. I then force air, either hot or cold, by a blower or other suitable device into tubes $c^2$ and $u$ and tank $t$, where it becomes sufficiently carbonized to burn and generate heat. A portion of the carbonized air is then admitted through the tube $x$ into the upper end of coil $e$ by opening the cock $y$. The carbonized air is conveyed down through the coil $e$ into the burner $z$, where it is ignited, the flames therefrom rising and heating the retort $d$, coils $e$ and $f$, and casing $b$; and then in a few moments, when the apparatus has become hot, the cocks $r$ and $n$ are opened, and limited amounts of the oil and water from tanks $k$ and $o$ are allowed to flow into retort $d$ and steam-coil $f$, respectively, the oil being converted into gas and vapor, which fills the retort, and the water being converted in the coil into highly-heated steam. The cock $y$ may be now closed, and cocks $j$ and $g$ opened sufficiently to allow a limited amount of hot steam and vapor of carbon in proper proportions to enter the coil $e$, following down which it becomes more and more heated until thorough decomposition of the steam and carbon is effected and a more intense heat in the apparatus is produced.

When the gas thus produced is used solely for heating purposes I admit as much steam as the carbon, when mingled and heated with it, will decompose, thus obtaining the largest amounts of the most desirable heating-gases, (hydrogen and carbonic oxide;) but when illuminating-gas is required I admit only so much steam as, when decomposed, will dilute the rich hydrocarbon-gas sufficiently to prevent smoking when the gas is used through an ordinary burner.

When non-illuminating gases are required for other purposes besides heating the apparatus, the surplus gases may be conveyed off through the pipe $m^2$ to the place of storage or consumption.

As the steam from the coil $f$ and vapor from retort $d$ are drawn off fresh, raw material will flow in from tanks $k$ and $o$ and immediately become vaporized. In case the vapors are drawn off too rapidly, and the liquids from tanks $k$ and $o$ enter the coil and retort too freely, no danger arises from over-pressure, as the valves $m$ and $g$ (represented at $m$, Fig. 2, on an enlarged scale) will immediately open and allow the liquids a free passage back to their respective tanks $k$ and $o$.

With the view of utilizing the surplus heat which would otherwise be carried off through the flue $b^2$, all the atmosphere required to support combustion in the apparatus is caused to enter through the perforations at the lower end of casing $b$ under the burner $z$. Thus it will readily be seen that both the incoming gaseous fuel and the air for supporting combustion are highly heated by the outgoing waste products of combustion, and at the same time the heat is being continually returned to the lower part of the apparatus, where the greatest amount of heat is required.

For general domestic illuminating purposes I prefer to use the light products of petroleum alone in tanks $t$ and $k$, and to admit the gases and vapors (while hot) generated therefrom through the cock $i$ into tube $u$, where they mingle with the proper quantity of air (hot or cold, as the temperature of the surrounding atmosphere may require) forced in through the tube $c^2$, the mixed mass being then passed through the tank $t$. This tank is kept in a cool place, and when any heavy or undecomposed particles of the oil-vapors remain they are condensed and deposited within this tank, while the gases pass off through tube $v$ for use. Any liquid from condensed vapors is from time to time allowed to flow through tube $w$ into tank $k$, whence it passes again into retort $d$, to be vaporized.

In setting up the apparatus care must be taken to place the tanks $o$ and $k$ sufficiently high to give the requisite pressure to the gas and vapors, and at the same time not so high as to allow any raw material to be drawn through the cocks $i, j$, and $g$, when the apparatus is cold or insufficiently heated to convert the oil and the water into vapor and steam.

The apparatus usually employed for supplying atmospheric air to the gas intended for illuminating purposes, exerts an uneven pressure and causes an unsteady light. To obviate such difficulties I employ the regulator $d^2$. The average pressure of the air-supply apparatus is intended to raise the inverted vessel of this regulator very lightly against the spring $h^2$. The lever $f^2$ is so placed and attached to the guide-rod $e^2$ as to allow the valve $i$ to stand open while using the gas through pipe $v$, and while the regulator is at its proper height for the pressure required; but when the gas is shut off at the burners or tube $v$ and the oil is still allowed to pass from tanks $t$ and $k$, there will follow in the tubes $u$, $c^2$, and $g^2$ an increase of pressure which will immediately cause the inverted vessel of regulator $d^2$ to rise, carrying with it the lever $f^2$, and closing the valve $i$, which will remain closed until the gas is again used, when the regulator will fall and reopen the valve $i$. When the valve $i$ is closed there will enter the retort $d$ only enough oil to supply the burner $z$ and whatever other gas is used through the branch pipe $m^2$. The converting-coil $e$ and the steam-generating coil $f$ may be dispensed with when making gas to be mixed with common air for illuminating purposes; or other forms of apparatus may be used for decomposing the water, but I prefer to use the coil as represented.

The spring $h^2$ may be dispensed with, but the regulators in such case will work with less efficiency.

Instead of using gas for combustion in the burner Z a coal or other fire may be substituted. I, however, prefer the use of gas in the manner set forth.

The casings $a$ and $b$ may be other than cylindrical in form, but I prefer the cylindrical form, as being cheaper in construction and stronger.

Instead of the number of small air-holes at the top of the cylinder $a$ one continuous hole may be employed to admit the air.

I claim—

1. The arrangement of the cylinder $a$, having several small air openings or a single continuous air-opening at or near its top, the inner cylinder $b$ having several air-openings or a single continuous air-opening at its lower end, the air-space $c$ between said cylinders, the gas-burner $z$ or equivalent heater arranged within the cylinder $b$ at or near its bottom, and the draft-flue $b^2$, opening into the space within the cylinder $b$, to which it is attached at or near its top, all for the purpose of heating the air used for combustion, substantially as described.

2. The combination of the cylinder $a$ with its air-openings or opening, the cylinder $b$ with its air-openings or opening, the intervening air-space $c$, the gas-burner $z$ or equivalent heater within cylinder $b$, the draft-flue $b^2$, the retort $d$, converting-coil $e$, and steam-generating coil $f$, constructed and arranged in the manner and for the purpose substantially as set forth.

3. The combination of the governor $d^2$ with its spring $h^2$, the lever $f^2$, cock $i$, pipe $h$, and retort $d$, constructed and arranged substantially as set forth.

4. The pipes $l$ and $p$ with their bends $s$, when attached at one end to tanks $k$ and $o$ and at their other ends to coil $f$ and retort $d$, in the manner and for the purpose substantially as set forth.

5. The arrangement of tanks $k$ and $o$, so that they are a little below the top of the retort $d$, insuring automatic pressure sufficient to force the gas from the retort into its connecting-pipes, and preventing overflowing into said connecting-pipes from the said tanks, when the apparatus is cold or but a little heated, substantially as set forth.

6. The tank $t$, in combination with the pipe $x$, coil $e$, burner $z$, and retort $d$, in manner and for the purpose substantially as set forth.

7. The safety-valves $m$ and $q$, in combination with the other apparatus described, in the manner and for the purpose substantially as set forth.

8. The combination of a blower or equivalent device with tube $c^2$, tube $u$, and tube $h$, leading to the retort $d$, all for the introduction of atmospheric air by force into the hot gas and vapors between the retort $d$ and the point of delivery, substantially as set forth.

T. S. C. LOWE.

Witnesses:
ED. J. FASY,
WM. MOORE.